United States Patent
Assalita et al.

[19]
[11] Patent Number: 5,922,367
[45] Date of Patent: *Jul. 13, 1999

[54] INJECTION MOLD HAVING HEATED SPRUE BUSHING

[75] Inventors: Edward Joseph Assalita, Abbottstown; Scott Wayne Hall, Harrisburg, both of Pa.

[73] Assignee: The Whitaker Corporation, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,009

[22] Filed: Mar. 26, 1997

[51] Int. Cl.$^6$ .................................................. B29C 45/74
[52] U.S. Cl. ........................... 425/549; 425/569; 425/572
[58] Field of Search ........................... 425/549, 547, 425/548, 567, 569, 192 R, 572; 264/328.15

[56] References Cited

U.S. PATENT DOCUMENTS

| | | |
|---|---|---|
| 3,935,972 | 2/1976 | Tsunemoto et al . |
| 4,273,525 | 6/1981 | Reitan ..................................... 425/549 |
| 4,304,544 | 12/1981 | Crandell ................................. 425/549 |
| 4,653,995 | 3/1987 | Ward .................................. 425/192 R |
| 4,892,474 | 1/1990 | Gellert .................................... 425/549 |
| 4,902,218 | 2/1990 | Leonard et al. ........................ 425/549 |
| 5,352,109 | 10/1994 | Benenati . |
| 5,484,275 | 1/1996 | Kushnir .................................. 425/549 |

FOREIGN PATENT DOCUMENTS

0 402 501 A1  12/1990  European Pat. Off. .

OTHER PUBLICATIONS

Catalog 3 pages; D–M–E; 1990.
Catalog pp. 3.2–3.5; Fast Heat Element.
Catalog 4 pages; Polyshot; Aug. 1991.

Primary Examiner—Harold Y. Pyon
Assistant Examiner—Joseph Leyson
Attorney, Agent, or Firm—Katherine A. Nelson; Anton P. Ness

[57] ABSTRACT

An injection mold machine (10) is disclosed including a mold (40) having closely spaced mold cavities (56, 58). A heated sprue bushing (62) is disposed between the mold cavities so that the runners (142, 144) are relatively short. The sprue bushing has an elongated portion (78) that is narrow and fits between the mold cavities (56, 58). Two rather slender cartridge heaters (126) are disposed in holes (112, 114) formed in the elongated portion on opposite sides of the sprue opening (102) through which the molten material is injected.

19 Claims, 6 Drawing Sheets

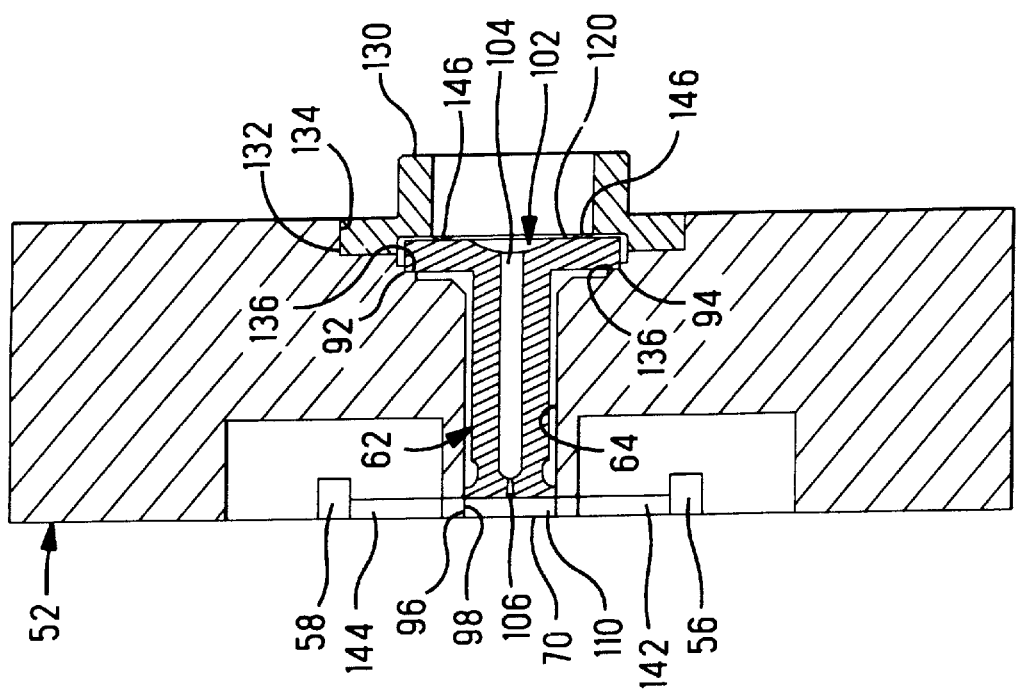
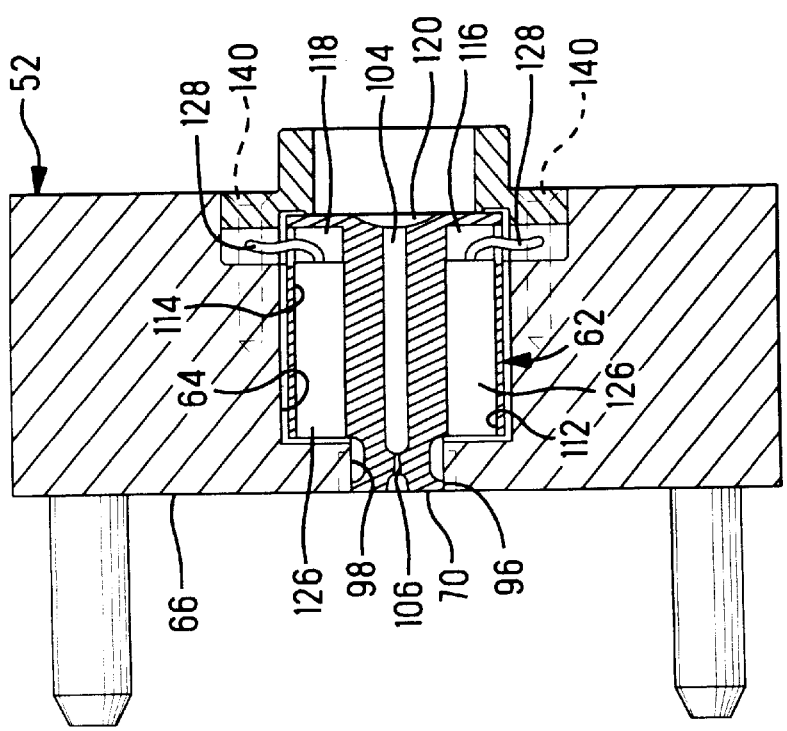

INJECTION MOLD HAVING HEATED SPRUE BUSHING

The present invention relates to injection molds of the type having a heated sprue bushing arranged between multiple mold cavities and more particularly to such molds wherein the mold cavities are closely spaced to reduce runner length.

BACKGROUND OF THE INVENTION

Injection mold machines for making molded parts utilize two part molds, having mold cavities formed therein, that can be separated to remove the molded part. The polymer molding material is heated to a molten state and forced through a passageway consisting of the feed screw barrel, nozzle, sprue bushing, runner and gate and into the mold cavity. Once the mold cavity is filled with molten material it is cooled so that the molded part solidifies. The two-part mold is then opened and the molded part removed in the usual manner. This process requires that at some point along the passageway there be a cold/hot junction, one side of which the material solidifies along with the cooling part and the other side of which the material remains molten. This cold/hot junction is typically provided by means of a sprue bushing having an entry hole that forms a portion of the hot portion of the passageway and a smaller tapered hole in intersection with the entry hole that forms a portion of the cold portion of the passageway. This tapered hole leads into a runner portion of the passageway that leads directly to the mold cavity. The tapered hole is usually quite long because it must extend deeply into the mold to reach the mold cavity. After the molded part is cooled, it has attached thereto the material from the runner and the tapered hole. This extra amount of material is waste and is removed from the part and discarded. When molding relatively small parts, such as electrical connector housings, the amount of extra material can exceed the material used in the molded part, thereby increasing material costs substantially. Additionally, the cycle or recovery time of the mold, that is, the time it takes to operate the mold to make a molded part is partly affected by the time that it takes to inject the material into the mold cavity, the tapered hole, and the runner as well as the time that it takes to replace the melted material that has been used. In an effort to reduce the amount of waste material and to reduce the recovery time, so called, hot sprue bushings have been developed. In such bushings the cold/hot junction is relatively close to the runner leading to the mold cavity so that the tapered hole is relatively short, however, the entry hole is correspondingly longer. To prevent the material in the entry hole from solidifying when the part is cooled, the portion of the bushing through which the entry hole extends is heated by means of a separate electric heater that is wound around the periphery of the bushing. This, of course, makes the outer diameter of the sprue bushing considerably larger, requiring that the bushing be further from the mold cavity necessitating a longer runner. Therefore, what is saved by shortening the tapered hole is somewhat lost by having a longer runner.

What is needed is a heated sprue bushing having a relatively short tapered hole, that is small enough to be used closely adjacent the mold cavity so that the runner is relatively short, thereby using less material and shortening the recovery time.

SUMMARY OF THE INVENTION

An injection molding machine is disclosed including a mold having two closely spaced mold cavities for receiving injected material in the manufacture of molded parts. A heated sprue bushing is arranged between and closely adjacent the two mold cavities. The heated sprue includes a body having an elongated portion. An injection opening is formed through the body and serves as the conduit through which the injected material flows to the two mold cavities. First and second openings are formed in the elongated portion of the body on opposite sides of and immediately adjacent the injection opening. Two heaters are provided, one heater in each of the first and second openings.

DESCRIPTION OF THE FIGURES

FIG. 5 is a cross-sectional view taken along the lines 5—5 in FIG. 4;

FIG. 6 is a cross-sectional view taken along the lines 6—6 in FIG. 4;

DESCRIPTION OF THE PREFERRED EMBODIMENT

Figure 1:
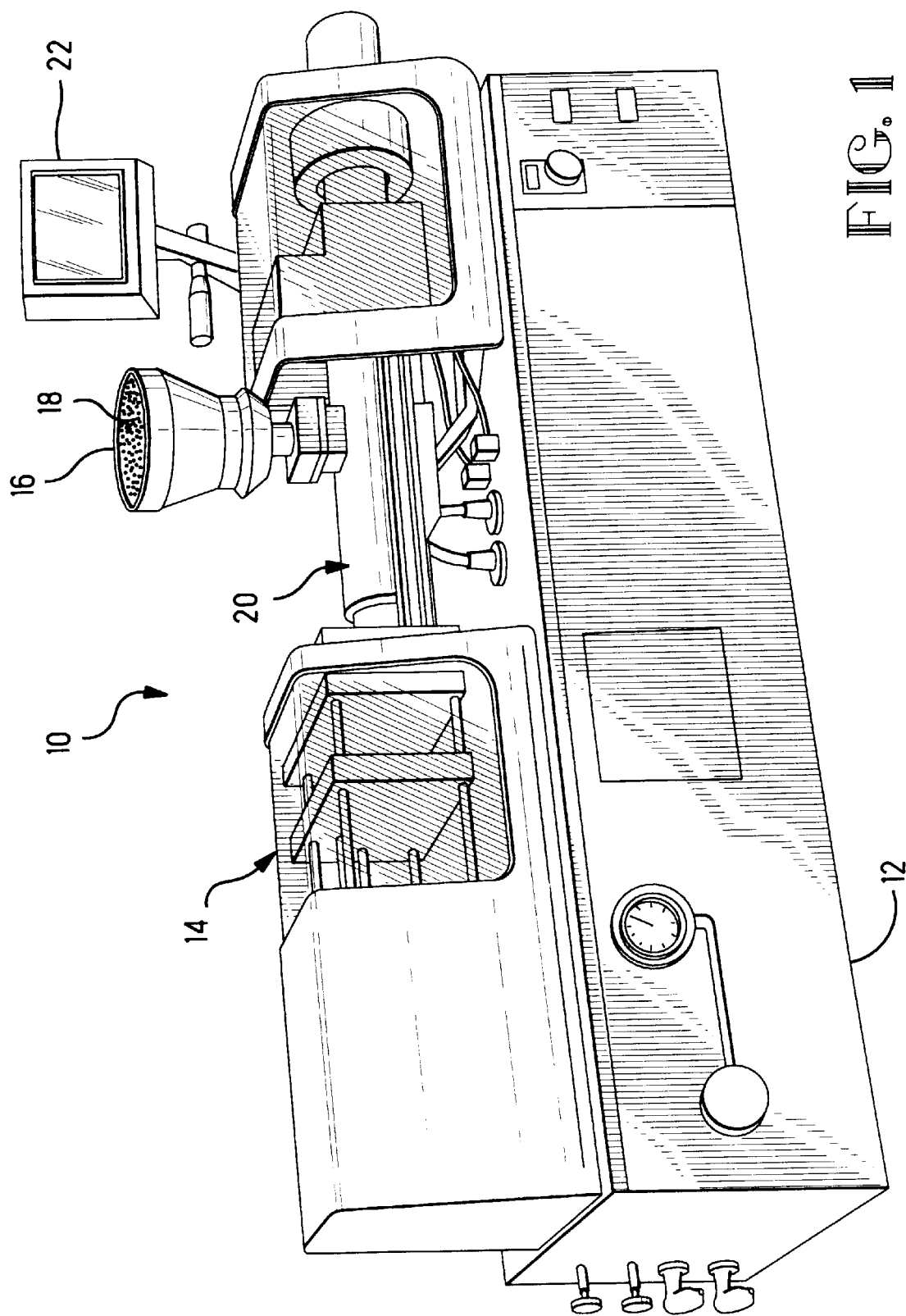
FIG. 1 is an isometric view of a molding machine incorporating the teachings of the present invention.
Figure 2:
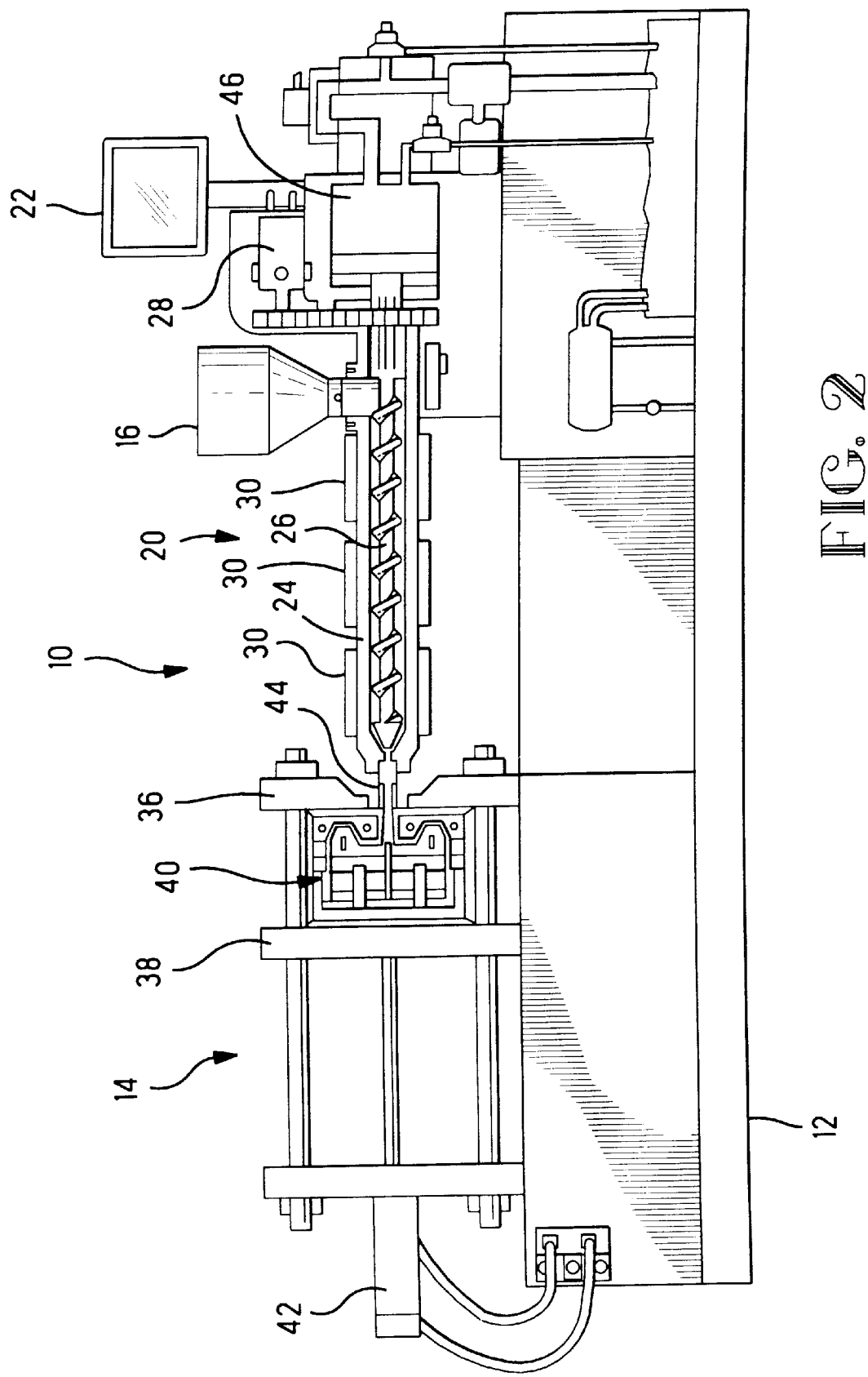
FIG. 2 is a schematic representation of the mold machine shown in FIG. 1 in partial cross section showing the major components of the machine.

There is shown in FIG. 1 a mold machine 10 having a press platform 12, a mold and mold actuator compartment 14, a hopper 16 containing pellets 18 of material to be melted, a pellet heating and feed station 20, and a control console 22. The machine 10 is shown in schematic form in FIG. 2 wherein the major functional element of the machine are depicted. As best seen in FIG. 2, the feed station 20 includes a barrel 24 having a feed screw 26 rotationally driven by a drive motor 28. As the feed screw rotates, pellets 18 are transferred from the lower portion of the hopper 16 along the barrel toward the left, as viewed in FIG. 2. Several heaters 30 are arranged about the barrel and spaced along its length to melt the pellets 18 and maintain the injection material in a molten state. The mold compartment 14 houses a stationary platen 36 and a movable platen 38 to which mold tooling 40 is attached. The movable platen 38 is operated by a hydraulic cylinder 42 which moves the movable platen to open and close the mold tooling, in the usual manner. A nozzle 44 interconnects the barrel 24 with the mold tooling 40 for passage of the molten injection material. A hydraulic injection cylinder 46 provides the high pressure required to inject the molten material into the mold tooling.

Figure 3:
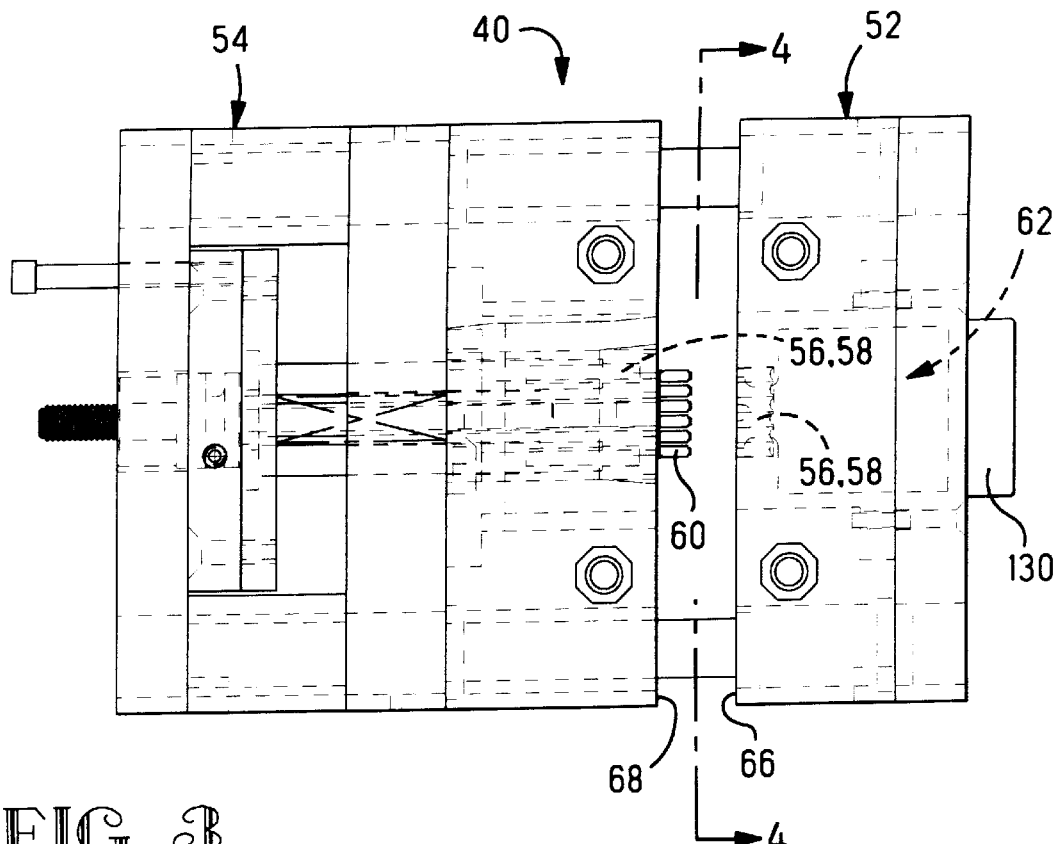
FIG. 3 is a front view of the mold shown in FIG. 2.
Figure 4:
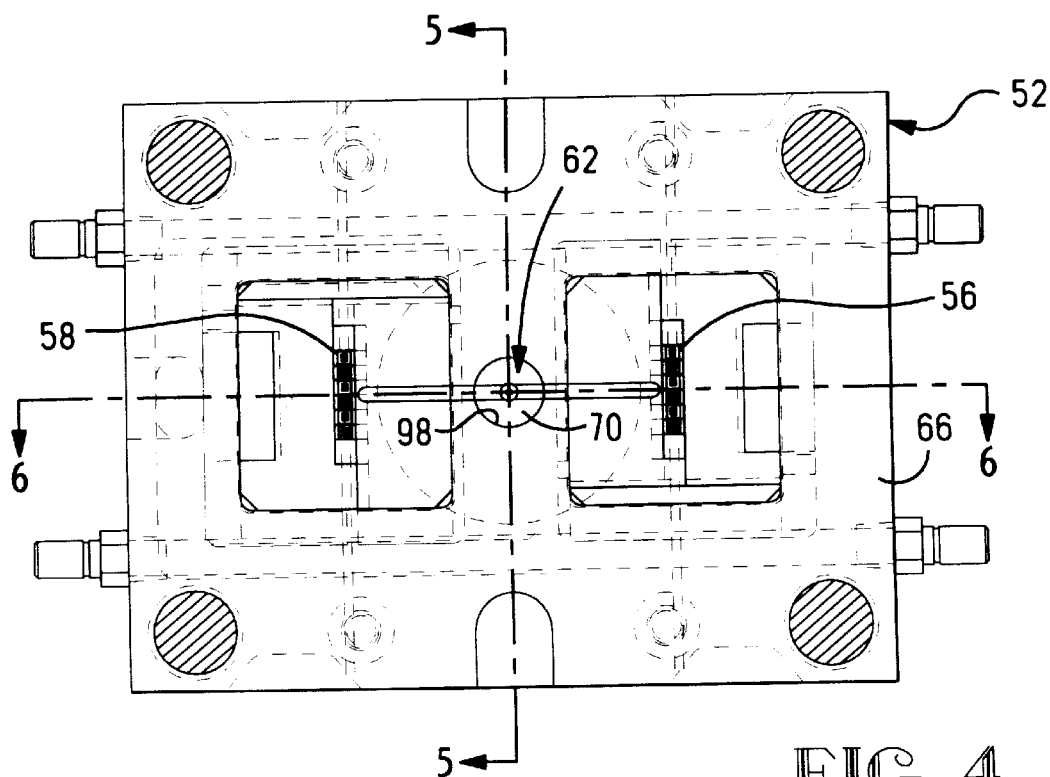
FIG. 4 is a cross-sectional view taken along the lines 4—4 in FIG. 3.

The mold tooling 40, as best seen in FIG. 3, includes an A-side mold half 52 which is secured to the stationary platen 36 and a B-side mold half 54 which is secured to the movable platen 38. As shown in FIG. 4, the A-side mold half 52 has first and second mold cavities 56 and 58, respectively. The B-side has corresponding mold cavities 56' and 58' that mate with the A-side mold cavities to make the molded parts. Laminates 60 extend from the B-side 54 and are positioned to enter into the A-side mold half cavities when the mold tooling is closed to form the interior structure of the molded parts, in the usual manner. A sprue bushing 62 is disposed within an opening 64 formed in the A-side mold half, as seen in FIGS. 5 and 6. The end 70 of the sprue bushing 62 is slightly recessed from the parting line surface 66, which mates with the surface 68 of the B-side when the mold tooling is closed.

Figure 7:
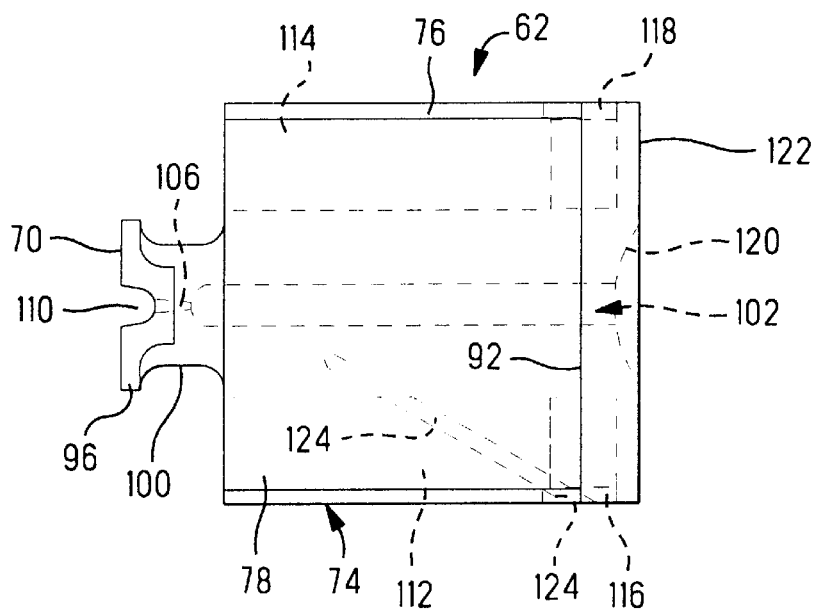
FIGS. 7, 8, 9, and 10 are front, right side, left side, and bottom views, respectively, of the sprue bushing shown in FIG. 5.
Figure 8:
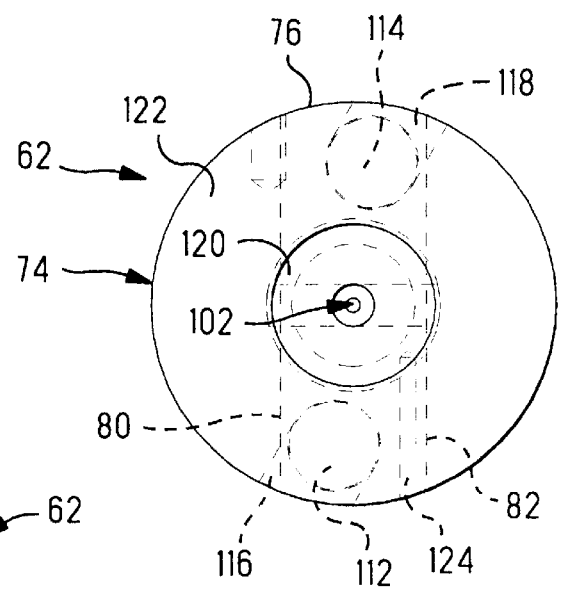
Figure 9:
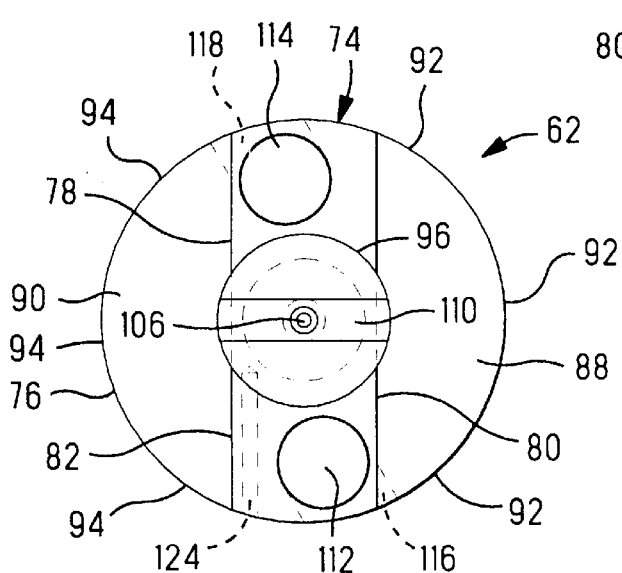
Figure 10:
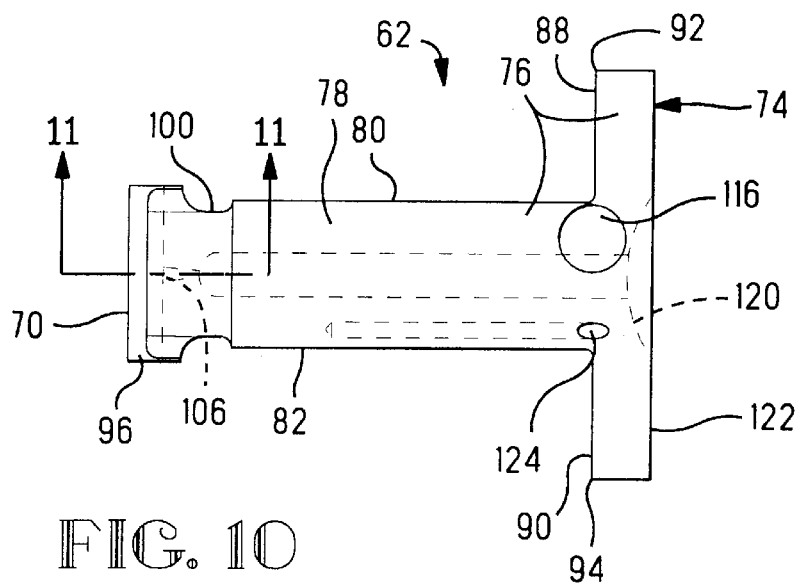
Figure 11:
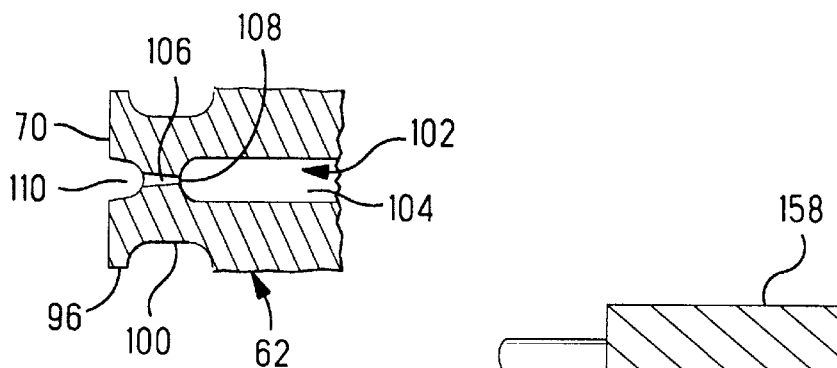
FIG. 11 is a cross-sectional view taken along the lines 11—11 in FIG. 10.

The sprue bushing 62, as best seen in FIGS. 7 through 11, includes a body 74 having a substantially cylindrical-shaped outer periphery surface 76, and an elongated portion 78 having two oppositely formed flat parallel surfaces 80 and 82 that extend to the outer peripheral surface 76, as shown in FIG. 7 and 9. The surfaces 80 and 82 terminate in flange forming shoulders 88 and 90 that extend to and intersect the outer periphery of the body 74 at corners 92 and 94, respectively. The end of the body 74 opposite the corners 92 and 94 has a reduced diameter portion 96 extending therefrom which is in slip fit engagement with a bore 98 formed in the A-side mold, the bore being in communication with the opening 64. An undercut 100 is formed in the reduced diameter portion 96 so that the surface area of the reduced diameter portion that is in contact with the wall of the bore 98 is of a desired amount, for a purpose that will be explained. An opening 102, as best seen in FIGS. 7, 8, and 11, extends completely through the body 74 and includes a hot portion 104 which terminates adjacent the end of the elongated portion 78 and a cold portion 106 that extends outwardly from an intersection 108 with the hot portion to the end 70, as best seen in FIG. 11. The cold portion 106 is tapered outwardly from the intersection 108 and terminates in a U-shaped runner entrance 110. Two blind holes 112 and 114 are formed in the body 74 parallel to and on opposite sides of the opening 102. The holes 112 and 114 extend completely through the elongated portion 78 between the flat surfaces 80 and 82, as best seen in FIGS. 7, 8, and 9. Two exit openings 116 and 118 are formed through the outer surface 76 and into intersection with the holes 112 and 114, respectively. A radius 120 is formed in the surface 122 of the body 74 in alignment with the opening 102 for receiving the nozzle 44. Another blind hole 124 is formed through the outer surface 76 that extends deep into the elongated portion 78 for receiving a thermocouple. As best seen in FIG. 5, a cartridge heater 126 is disposed in each hole 112 and 114. Any suitable electrical cartridge heater may be used that is small enough to fit within the holes 112 and 114 between the two flat surfaces 80 and 82, such as cartridge heater model number CHS9 677822-10, which is distributed by Injection Molder Supply Co., of 16373 Stanford Road, Chagrin Falls, Ohio 44023-5296. Each cartridge heater 126 includes leads 128 that are routed through its respective exit opening 116 or 118. The corners 92 and 94 of the sprue bushing 62 are supported in a very narrow nest 136 formed in the wall of the opening 64, as best seen in FIG. 6. Only a small portion of the surfaces 88 and 90 and the outer surface 76 near the corners 92 and 94 are in engagement with the nest 136. The heated sprue bushing is held in place by means of a locating ring 130 having an outer diameter 132 that is arranged in a counterbore 134 in the A-side mold half 52. The locating ring 130 includes three spaced pads 146 that project outwardly into engagement with the surface 122 of the sprue bushing. The locating ring 130 is secured to the A-side mold by means of screws 140, as shown in FIG. 5, that extend through clearance holes in the locating ring and into threaded holes in the mold. Contact between the sprue bushing 62 and the Aside mold half 52 is limited to the small surfaces near the corners 94 in contact with the nest 136, the small surface area of the reduced diameter 96 that is in contact with the bore 98, and the three pads 146 of the locating ring 130. The amount of this surface area that is in contact is chosen to control heat transfer between the mold components. The mold cavities 56 and 58 are interconnected to the U-shaped runner entrance 110 by means of runners 142 and 144, respectively, in the usual manner.

In operation, the clamping mechanism 42 is actuated to move the B-side mold half 54 into closed engagement with the A-side mold half 52 so that the parting line surfaces 66 and 68 are in clamped engagement. It will be assumed that the machine 10 has been in continuous operation and that molten material is in the barrel 24, nozzle 44, and the hot portion 104 of the opening 102 of the sprue bushing 62. The injection cylinder 46 is actuated so that the molten material is forced through the barrel 24, nozzle 44, hot and cold portions 104 and 106 of the sprue bushing, the runners 110, 142, and 144, through the gates and into the mold cavities 56 and 58. The injection cylinder 46 supplies the necessary pressure to assure complete penetration of the mold cavities in the usual manner. The mold is then cooled and the injection cylinder pressure brought to zero. As the parts cool and solidify the drive motor 28 is actuated to rotate the feed screw 26 so that additional molten material is prepared for the next cycle. The recovery time, which is the time it takes for the feed screw to advance the additional molten material, ideally will be equal to the time it takes for the molded parts to cool and solidify. However, when molding very small parts this equality is difficult to achieve, especially when using a cold sprue bushing. Note that the material in the cold portion 106 and runners 110, 142, and 144 solidifies along with the material in the mold cavities so that when the B-side of the mold is opened these solidified pieces are degated from the molded parts in the usual manner. The mold material remaining in the hot portion 104 of the opening 102 does not solidify and is used during the next machine cycle.

Figure 12:
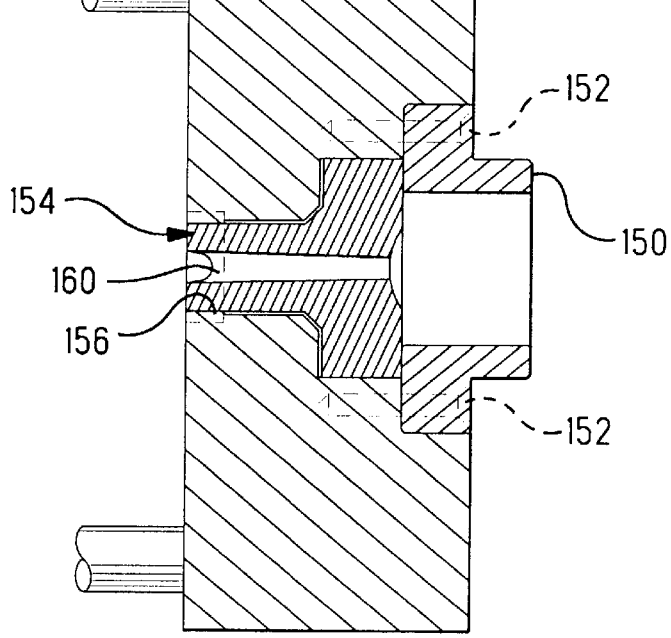
FIG. 12 is a view similar to that of FIG. 5 showing a prior art sprue in the mold.

While, in the above example, a mold having two mold cavities 56 and 58 was described, the present invention may be advantageously utilized with molds having one or more mold cavities. These molds will require less material for each mold cycle and will have a quicker recovery time than molds utilizing a cold sprue bushing or molds using a conventional hot sprue bushing. By way of contrast, a mold utilizing a cold sprue bushing 154 is shown in FIG. 12. The cold sprue bushing 154 is held in an opening 156 in a mold half 158 by means of a locating ring 150 and two screws 152 in the usual manner. The cold sprue bushing has a relatively long tapered opening 160 through which the molten material is passed on its way to the mold cavities. In this example, the entire sprue bushing is cooled along with the two mold halves so that the material within the length of the opening 160 is cooled and solidified along with the molded part. In the case of a single mold cavity for molding a typical electrical connector housing composed of 0.36 grams of material, the mold having a cold sprue will require approximately 0.69 grams of material for the sprue opening and the runner while the mold having a hot sprue, in accordance with the present invention, will require approximately 0.42 grams of material for the sprue opening and runner, for a material savings of approximately 39 percent. Additionally, the cycle time for the mold having the cold sprue is approximately 4.5 seconds while the cycle time for the mold having the hot sprue is approximately 2.9 seconds for a reduction in cycle time of approximately 36 percent. These savings in both material and recovery time yielding a total cost reduction to make the part of approximately 23 percent.

Accordingly, an important advantage of the present invention is the substantial cost savings in both time and material.

Additionally, the structure of the hot sprue bushing of the present invention can be utilized in very tight quarters in relatively small molds where the mold cavities are spaced so close together that a conventional hot sprue bushing would not fit.

We claim:

1. In an injection molding machine including a mold having two closely spaced mold cavities for receiving injected material in the manufacture of molded parts, a heated sprue bushing arranged between and closely adjacent said mold cavities comprising:

(a) a body having an outer periphery and an elongated portion with first and second opposite surfaces that extend to said outer periphery and terminate in flange forming shoulders;

(b) an injection opening formed through said body through which said injected material flows to said two mold cavities;

(c) first and second openings formed in said elongated portion of said body between said first and second surfaces on opposite sides of and immediately adjacent said injection opening; and (d) two heaters, one said heater in each of said first and second openings.

2. The machine according to claim 1 wherein said first and second openings are holes formed substantially parallel to said injection opening and said heaters are cartridge heaters sized to closely fit within said first and second holes.

3. The machine according to claim 2 wherein said body includes a reduced diameter portion extending therefrom, and wherein said injection opening includes a hot portion and a cold sprue portion, said cold sprue portion being in said reduced diameter portion only.

4. The machine according to claim 3 wherein said heaters extend only the length of said first and second openings and terminate short of said reduced diameter portion.

5. The machine according to claim 4 wherein said reduced diameter portion includes an undercut thereby leaving only a relatively small portion of said reduced diameter portion in engagement with said mold, said undercut being sized to control heat loss so that injection material in said hot portion of said injection opening remains molten and injection material in said cold sprue portion solidifies, upon cooling of said molded part.

6. The machine according to claim 5 wherein said body includes a pair of flanges extending outwardly from an end of said body opposite said reduced diameter portion, said pair of flanges having corners in engagement with a narrow nest formed in said mold, wherein said body is held in said mold by means of a locating ring having spaced pads in engagement with portions of an upper surface of said body, said corners of said flanges, said small portion of said reduced diameter, and said portions of said upper surface being the only portions of said sprue bushing in engagement with said mold.

7. In an injection molding machine including a mold having two closely spaced mold cavities for receiving injected material in the manufacture of molded parts, a heated sprue bushing arranged between and closely adjacent said mold cavities comprising:

(a) a body including an elongated portion having first and second oppositely formed substantially parallel surfaces;

(b) an injection openings formed through said body between and parallel to said first and second surfaces, through which said injected material flows to said two mold cavities;

(c) first and second heaters coupled to said body and positioned only on opposite sides of and immediately adjacent said injection openings,
      wherein said first surface is closely adjacent one of said mold cavities and said second surface is closely adjacent the other of said mold cavities.

8. The machine according to claim 7 including first and second holes formed in said body between said first and second surfaces, said first and second heaters being cartridge heaters disposed in said first and second holes, respectively, each said heater sized to closely fit within its respective said hole.

9. The machine according to claim 8 wherein said body includes a reduced diameter portion extending therefrom, and wherein said injection opening includes a hot portion and a cold sprue portion, said cold sprue portion being in said reduced diameter portion only.

10. The machine according to claim 9 wherein said first and second heaters extend substantially only the length of said first and second openings and terminate substantially short of said reduced diameter portion.

11. The machine according to claim 10 wherein said reduced diameter portion includes an undercut thereby leaving only a relatively small portion of said reduced diameter portion in engagement with said mold, said undercut being sized to control heat loss so that injection material in said hot portion of said injection opening remains molten while injection material in said cold sprue portion solidifies, upon cooling of said molded part.

12. The machine according to claim 11 wherein said body includes an enlarged diameter on one end thereof opposite said reduced diameter portion, said enlarged diameter having a corner of a shoulder formed therein that is in engagement with a narrow nest formed in said mold, wherein said body is held in said mold by means of a locating ring having spaced pads in engagement with portions of an upper surface of said body, said corner, said small portion of said reduced diameter, and said portions of said upper surface being the only portions of said sprue bushing in engagement with said mold.

13. In an injection molding machine including a mold having at least one mold cavity for receiving injected material in the manufacture of molded parts, a heated sprue bushing arranged closely adjacent said mold cavity comprising:

(a) a body having an outer periphery and an elongated portion with first and second opposite surfaces that extend to said outer periphery and terminate in flange forming shoulders;

(b) an injection opening formed through said body through which said injected material flows to said mold cavity;

(c) a first opening formed in said elongated portion of said body between said first and second surfaces immediately adjacent said injection opening; and (d) a heater in said first opening.

14. The machine according to claim 13 wherein said first opening is a hole formed substantially parallel to said injection opening and said heater is a cartridge heater sized to closely fit within said first hole.

15. The machine according to claim 14 wherein said body includes a reduced diameter portion extending therefrom, and wherein said injection opening includes a hot portion and a cold sprue portion, said cold sprue portion being in said reduced diameter portion only.

16. The machine according to claim 15 wherein said heater extends only the length of said first opening and terminates short of said reduced diameter portion.

17. The machine according to claim 16 wherein said reduced diameter portion includes an undercut thereby leaving only a relatively small portion of said reduced diameter portion in engagement with said mold, said undercut being sized to control heat loss so that injection material in said hot portion of said injection opening remains molten and injection material in said cold sprue portion solidifies, upon cooling of said molded part.

18. The machine according to claim 17 wherein said body includes a pair of flanges extending outwardly from an end of said body opposite said reduced diameter portion, said pair of flanges, each having a corner of a shoulder formed therein that is in engagement with a narrow nest formed in said mold, said body being retained in said mold by a locating member having spaced pads in engagement with surfaces of said body, said shoulder, said surfaces of said body, and said small portion of said reduced diameter being the only portions of said sprue bushing in engagement with said mold.

19. The machine according to claim 18 including an exit opening in one of said pair of flanges in intersection with said first hole containing electrical wires attached to said first heater.

* * * * *